(12) United States Patent
Shalaby

(10) Patent No.: US 7,138,464 B2
(45) Date of Patent: *Nov. 21, 2006

(54) FUNCTIONALIZED, ABSORBABLE, SEGMENTED COPOLYESTERS AND RELATED COPOLYMERS

(75) Inventor: Shalaby W. Shalaby, Anderson, SC (US)

(73) Assignee: Poly Med, Inc, Anderson, SC (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/693,361

(22) Filed: Oct. 24, 2003

(65) Prior Publication Data

US 2004/0132923 A1    Jul. 8, 2004

Related U.S. Application Data

(60) Provisional application No. 60/422,651, filed on Oct. 31, 2002.

(51) Int. Cl.
  *C08F 20/00*  (2006.01)
(52) U.S. Cl. .................. 525/411; 525/437; 525/445; 525/447; 525/451
(58) Field of Classification Search ............... 525/437, 525/445, 447, 451
  See application file for complete search history.

(56) References Cited

U.S. PATENT DOCUMENTS

| | | | |
|---|---|---|---|
| 4,689,424 A | 8/1987 | Shalaby et al. | |
| 5,047,048 A | 9/1991 | Bezwada et al. | |
| 5,133,739 A | 7/1992 | Bezwada et al. | |
| 5,322,908 A * | 6/1994 | Hamazaki et al. | ......... 525/445 |
| 5,449,719 A * | 9/1995 | Sacripante et al. | ......... 525/445 |
| 5,468,253 A * | 11/1995 | Bezwada et al. | ......... 606/230 |
| 5,470,340 A | 11/1995 | Bezwada et al. | |
| 5,654,381 A | 8/1997 | Hrkach et al. | |
| 6,255,048 B1 | 7/2001 | Hosoi et al. | |
| 6,342,065 B1 | 1/2002 | Shalaby | |
| 6,413,539 B1 | 7/2002 | Shalaby | |
| 6,462,169 B1 | 10/2002 | Shalaby | |
| 6,551,610 B1 * | 4/2003 | Shalaby et al. | ......... 424/426 |
| 2002/0034533 A1 * | 3/2002 | Peterson et al. | ......... 424/423 |
| 2004/0023987 A1 * | 2/2004 | Hata et al. | ......... 514/260.1 |

\* cited by examiner

*Primary Examiner*—Randy Gulakowski
*Assistant Examiner*—Alicia M. Toscano
(74) *Attorney, Agent, or Firm*—Leigh P. Gregory

(57) ABSTRACT

Absorbable heterochain polymers carrying acid or basic groups, capable of ionic conjugation with basic or acidic bioactive agents, respectively, are produced by free-radical addition of unsaturated functional monomers onto absorbable liquid polymers and subsequent generation of reactive functionality or by direct copolymerization of a carboxylic initiator with cyclic monomers to produce liquid carboxyl-bearing copolyesters or polyester carbonates.

12 Claims, No Drawings

FUNCTIONALIZED, ABSORBABLE, SEGMENTED COPOLYESTERS AND RELATED COPOLYMERS

This application claims the benefit of prior provisional application U.S. Ser. No. 60/422,651, filed Oct. 31, 2002.

FIELD OF THE INVENTION

The invention relates to amine or carboxyl functionalized absorbable/biodegradable heterochain polymers capable of forming ionic or partially ionic conjugates with acidic or basic bioactive agents, respectively.

BACKGROUND OF THE INVENTION

Biocompatible, biodegradable polymers for various biomedical applications such as those used in sutures and tissue engineering have been described in "Functionalized Polyester Graft Copolymers," Hrkach et al., U.S. Pat. No. 5,654,381, issued Aug. 5, 1997. Poly-dl-lactide grafted with acrylic acid was prepared and used to bind, covalently, proteins and peptides to the polyacrylic graft [G. C. M. Steffens et al., *Biomaterials*, 23, 3523 (2002)]. In spite of the great interest in functionalized, degradable (or absorbable) polymers, the prior art was limited to a selected few homopolymers. Accordingly, relatively new absorbable copolyesters, which are being explored in many biomedical and pharmaceutical applications, have been ignored as precursors of functionalized systems. Among these precursors are high-compliance, absorbable copolyesters used in the prior art for the production of fibers and films with unique properties as biomedical devices [Bezwada et al., U.S. Pat. No. 5,470,340 (1995), U.S. Pat. No. 5,133,739 (1992); Shalaby, U.S. Pat. No. 6,342,065 (2002), U.S. Pat. No. 6,255,408 (2001); Shalaby and Jamiolkowski, U.S. Pat. No. 4,689,424 (1987)]. Other families of potentially absorbable precursors are segmented polyetheresters, which have been used to produce novel types of absorbable fibers and films and also as vehicles for the controlled delivery of bioactive agents in the form of liquids, gels, and semi-solids [Bezwada et al., U.S. Pat. No. 5,047,048 (1991); Shalaby, U.S. Pat. No. 6,413,539 (2002).] Awareness of the importance of the potential value-added by introducing useful functional groups into the aforementioned segmented copolymers and other similar systems evoked the pursuit of the functionalized polymers, subject of this invention. Accordingly, the present invention deals with absorbable, segmented copolyesters and block copolymers of polyalkylene glycols containing predetermined amounts of functional side groups on their main chains.

SUMMARY OF THE INVENTION

The present invention is directed to the foregoing need. In one aspect the invention pertains to solid or liquid functionalized absorbable/biodegradable heterochain polymers comprising reactive amine or carboxylic groups for use in conjunction with acidic or basic bioactive agents.

Thus, the present invention is directed to an absorbable polymer for biomedical and pharmaceutical applications which is based on a segmented copolyester having at least one succinic anhydride side group per chain. The absorbable polymer may be made by the process of providing an absorbable, segmented copolyester, and reacting the copolyester with maleic anhydride in the presence of a free-radical initiator, preferably in an organic solvent. The step of providing an absorbable, segmented copolyester may be achieved by copolymerizing two or more cyclic monomers such as trimethylene carbonate, $\epsilon$-caprolactone, glycolide, lactide, p-dioxanone, or 1,5-dioxcpan-2-one. Alternatively, the step of providing an absorbable, segmented copolyester may be achieved by end-grafting a polyalkylene succinate, such as polytrimethylene succinate or polyethylene succinate, with one or more cyclic monomers such as trimethylene carbonate, $\epsilon$-caprolactone, glycolide, lactide, p-dioxanone, or 1,5-dioxepan-2-one. In another embodiment, the step of providing an absorbable, segmented copolyester may be achieved by end-grafting a polyalkylene glycol, such as polyethylene glycol or a block copolymer having polyoxyethylene and polyoxypropylene components, with one or more cyclic monomers such as trimethylene carbonate, $\epsilon$-caprolactone, glycolide, lactide, p-dioxanone, or 1,5-dioxepan-2-one. It is also within the scope of the present invention to hydrolyze the at least one anhydride side group per chain, thereby forming at least one dicarboxylic acid side group per chain. In a preferred embodiment the present absorbable polymer is a liquid at room temperature.

The present invention is also directed to an absorbable polymer which is a functionalized block copolymer of polyethylene glycol and propylene glycol, the block copolymer having more than three carboxyl groups per chain. Such polymer may be made by the process which includes the steps of providing a block copolymer of polyethylene glycol and propylene glycol, reacting the block copolymer with an unsaturated anhydride, such as maleic anhydride or itaconic anhydride, in the presence of a free-radical initiator, and hydrolyzing the resultant anhydride bearing block copolymer. Preferably, the present absorbable polymer is a liquid at room temperature.

The present invention is also directed to a liquid absorbable polymer which is a polyester having at least two carboxyl-groups per chain. Such polymer may be made by a process which includes the step of polymerizing at least one cyclic monomer in the presence of a hydroxy carboxylic acid initiator. In one embodiment, the step of polymerizing at least one cyclic monomer in the presence of a hydroxy carboxylic acid initiator involves polymerizing a mixture of trimethylene carbonate and glycolide in the presence of malic acid. In an alternative embodiment, the step of polymerizing at least one cyclic monomer in the presence of a hydroxy carboxylic acid initiator involves polymerizing a mixture of trimethylene carbonate and dl-lactide in the presence of malic acid. In yet another embodiment, the step of polymerizing at least one cyclic monomer in the presence of a hydroxy carboxylic acid initiator involves polymerizing a mixture of trimethylene carbonate and dl-lactide in the presence of citric acid.

DETAILED DESCRIPTION OF THE INVENTION

This invention deals, in general, with functionalized, segmented copolyesters and block copolymers of polyalkylene glycols having one or more acidic or basic groups attached directly or indirectly to the main chain, internally and/or at its terminals. A specific aspect of this invention deals with polyaxial (branched) segmented copolyesters (examples of the polyaxial copolymers are described in U.S. Pat. No. 6,462,169) made of two or more cyclic monomers, such as trimethylene carbonate, $\epsilon$-caprolactone, glycolide, lactide, p-dioxanone, and 1,5-dioxepan-2-one, carrying one or more alkylene dicarboxylate groups (or dicarboxylic acid) as side groups that are introduced into the main chain by reacting it with maleic anhydride in the presence of a free-radical initiator in a suitable liquid medium, followed by hydrolysis of the anhydride-type addition product to yield two carboxylic groups at each reacted site. Another aspect of this invention deals with a copolyester made by grafting one or more cyclic monomer, such as trimethylene carbonate, ε-caprolactone, glycolide, lactide, p-dioxanone, and 1,5-dioxepan-2-one, carrying one or more alkylene dicarboxylate groups (or dicarboxylic acid) as side groups that are introduced into the polymer chain by reacting it with maleic anhydride in the presence of a free-radical initiator, such as benzoyl peroxide or 2,2'-azo bis(2-methylpropionitrile) and preferably in a suitable liquid medium, using such a reaction temperature to allow adequate mixing of the reactants but preferably between 40° C. and 100° C., followed by hydrolysis of the anhydride-type addition product to yield two carboxylic groups at each reaction site. For the purpose of simplicity, the process used for introducing the dicarboxylic-containing side group is referenced herein as C-succinylation. One more aspect of this invention deals with the C-succinylation of a copolyester made by end-grafting one or more cyclic monomer, such as trimethylene carbonate, ε-caprolactone, glycolide, lactide, p-dioxanone, and 1,5-dioxepan-2-one, onto a polyalkylene succinate, such as polyethylene succinate or polytrimethylene succinate. Another aspect of this invention deals with segmented copolyester of types noted herein where the number of carboxylic groups per chain is more than one and preferably more than four.

Another aspect of this invention deals with block copolymers of polyalkylene glycols, such as those comprising polyethylene glycol and polypropylene glycol blocks, wherein the individual chain contains an average of two or more carboxyl groups. Such functionalized copolymer can be made by reacting the parent chains with maleic anhydride or itaconic anhydride in the presence of a free radical initiator such as benzoyl peroxide, 2,2-azo bis(2-methylpropionitrile) and preferably in an organic solvent as a medium at temperatures above 50° C. The anhydride groups are converted to carboxylic groups through hydrolysis.

Another aspect of this invention deals with functionalizing the copolymers subject of this invention using an alkyl cinnamate, such as methyl cinnamate, in the presence of a free-radical initiator and preferably in a suitable liquid medium using such a reaction temperature to allow adequate mixing of the reactants, but preferably between 40° C. and 100° C. following by hydrolysis of the ester-type addition product to yield one carboxylic group at each reaction site.

Another aspect of this invention deals with the free-radical addition of 1,2 disubstituted ethylenic monomer carrying one or two nitrile group instead of maleic anhydride onto an oxyalkylene polymer or copolymer, such as polyethylene glycol, polypropylene glycol, or block copolymers thereof, under reaction conditions similar to those described for the C-succinylation. The nitrile-bearing monomers suitable for the subject addition include one or more of the following: cinnamonitrile, 3-methyl acrylonitrile, fumaronitrile. The resulting nitrile-bearing polymers can then be hydrogenated, catalytically, using a catalyst such as palladium on carbon, dispersed in a suitable solvent, to yield the corresponding amine-bearing polymers.

Another aspect of this invention deals with the eventual introduction of the carboxylic groups as noted in this invention using two or more of the carboxyl-based, unsaturated monomeric precursors. Another aspect of this invention deals with the eventual introduction of amine groups as noted in this invention using two or more nitrile-based unsaturated monomeric precursors.

Functionalized polymers made by the free-radical addition of unsaturated monomers are referred to herein as EC-polymers.

A specific aspect of this invention deals with liquid absorbable/biodegradable polymers which comprise functional amine or carboxylic groups. The liquid polymers of the invention are functionalized, e.g. are those bearing moieties that provide suitable ionic attraction with basic drugs to generate the ionic bonding whereby the conjugates are formed. Such moieties include those that render the polymer acidic, e.g. carboxyl groups; or basic, e.g. amine groups. Without limitation, such polymers include carboxyl-bearing polyesters, copolyesters, polyalkylene carbonates and copolyester-carbonates, and amine-bearing polyethers, polyesters, copolyesters, polyalkylene carbonates, polyether carbonates, and copolyester carbonates. It is preferred if the acidic or basic groups of the functional polymer are sufficiently accessible for purposes of forming the select ionic linkage of a specific conjugate, e.g. in the case of a basic bioactive agent, that the acidic functional polymer has reasonably accessible carboxylic groups, for example. The polymers of the invention are absorbable, i.e. they are pharmaceutically acceptable and are biodegradable. The functional polymers of the invention can be made as liquids or solids. Without limitation and as appreciated by the artisan, the liquid polymers include those that are more hydrophilic and have shorter chain lengths as compared to their solid counterparts.

Another aspect of this invention deals with liquid carboxyl-bearing copolyesters having a molecular weight of less than 5 kDa made of one or more cyclic monomer using a hydroxy acid as the initiator and an organometallic compound as the initiator and catalyst, respectively. Examples of the cyclic monomers include 1,5-dioxepan-2-one, ε-caprolactone and/or trimethylene carbonate and preferably a combination of the latter with dl-lactide and glycolide and/or p-dioxanone. Examples of the hydroxy acids are malic, tartaric, and citric acid. An example of the cyanometallic compound is stannous octanoate. Polymers of this type are referred to in this invention as MC-copolymers.

The functionalized copolyesters and copolyethers described herein can be used to covalently bind basic bioactive agents by reacting such agents with their intermediate anhydride functionalities prior to hydrolysis to form an amic-acid side group, having a drug covalently bound and a free carboxyl group capable of ionic conjugation with an accessible basic site. The resulting covalent-ionic conjugate is referred to herein as partially ionic. Furthermore, the chains with anhydride hydrolyzed to produce carboxylic groups can be ionically conjugated with basic bioactive agents.

Another aspect of this invention deals with ionic conjugation of the carboxyl-bearing copolyesters with bioactive peptides, proteins, or simple organic drugs having a molecular weight of more than 150 Da and carrying one or more reactive basic group to yield solid or liquid conjugates capable of modulating the release of such bioactive agents in the biological environment.

Another aspect of this invention deals with the use of an amine-bearing polyalkylene oxide described herein to form liquid or solid ionic or partially ionic conjugates with carboxyl-bearing bioactive agents, including (1) organic drugs having a molecular weight exceeding 150 Da to increase their solubility if so needed; (2) synthetic peptide having a molecular weight of at least 400 Da; and (3) natural or recombinant proteins having a molecular weight of at least 5 kDa.

Described below are illustrative examples of the invention. It will be understood that these examples do not in any way constrain the scope of this invention. Modifications to some, as appreciated by the artisan, are also contemplated herein.

(GPC), and complex viscosity (rheometry). The respective data in Table 1 also show that the equivalent weight, $M_n$ and viscosity can be controlled readily by the comonomer composition and amount of malic or citric acid used in the preparation of the polymers.

TABLE I

Composition and Properties of Hydroxy Acid-initiated Copolymers

| Polymer[a] | Molar Ratio | | Equivalent Weight, g/Eq.* | Complex Viscosity @37° C., Pa.S | GPC Data | | |
|---|---|---|---|---|---|---|---|
| | Initiator[b] | Cyclic Monomers[c] | | | $M_n$, kDa | $M_{w1}$, kDa | PDI |
| D | 5 | TMC/G 85/10 | 1900 | 850 | 5.0 | 9.0 | 1.85 |
| E | 10 | 85/5 | 1500 | 537 | 3.4 | 6.8 | 2.01 |
| F | 5 | 90/5 | 2100 | 270 | 5.2 | 10.7 | 2.06 |
| G | 20 | 78/2 | 900 | 131 | 2.2 | 3.9 | 1.77 |
| H | 23 | 75/2 | 700 | 127 | 2.1 | 3.4 | 1.68 |
| I | 30 | 68/2 | 565 | 164 | 1.8 | 2.7 | 1.51 |
| J | 35 | 63/2 | 383 | 248 | 1.6 | 2.3 | 1.47 |
| K | 11.5 | LL/G 70.5/18 | 366 | — | 1.4 | 2.0 | 1.45 |
| L[b] | 9 | 73/18 | | — | 1.7 | 2.4 | 1.45 |
| M[b] | 11.5 | 70.5/18 | | — | 1.4 | 1.9 | 1.37 |
| N[b] | 30 | TMC/G/CL 50/2/18 | 342 | — | 1.6 | 2.3 | 1.43 |

[a]All polymers were purified by distilling residual monomer under reduced pressure.
[b]The initiator is malic acid with the exception of L and M where citric acid is used.
[c]TMC = trimethylene carbonate; G = glycolide; CL = caprolactone; LL = l-lactide.
*Mass of chain per carboxylic group.

EXAMPLE 1

Preparation of a Typical Liquid Carboxyl-bearing Copolyester

A mixture of dl-lactide (0.4 mole, 57.6 g), glycolide (0.1 mole, 11.6 g), dl-malic acid (0.065 mole, 8.71 g), and stannous octanoate (0.55 ml of 0.2 M solution in toluene) were charged into a pre-dried glass apparatus that was equipped for mechanical stirring. The polymerization was conducted at 160° C. for 3 hours under dry nitrogen atmosphere. At the conclusion of the polymerization period, the product was analyzed by gel-permeation chromatography (GPC) to assure maximum conversion. This was followed by evaporation of trace amounts of residual monomers by heating at 110° C. under reduced pressure. The identity of the purified liquid polymer was confirmed by IR and NMR. The GPC data (in dichloromethane) indicated an $M_n$=1360 Da and $M_w$=1930 Da.

EXAMPLE 2

Preparation and Characterization of Hydroxy Acid-initiated Copolymers

Several copolymers made from different cyclic monomers and malic or citric acid as the initiators were prepared as described in Example 1 and characterized for use in producing liquid conjugates as outlined in Table I. All polymers were liquids at room temperature. The polymers were characterized for carboxyl content (titration), molecular weight

EXAMPLE 3

Preparation and Characterization of C-succinylated Polyether-esters

Polyethylene glycols, PEG-400 and PEG-600, were end-grafted with mixtures of trimethylene carbonate (TMC) and caprolactone (CL) to produce liquid copolyesters. These were reacted with maleic anhydride under free-radical conditions. In a typical run, this entailed heating the polyether-ester (20 g) in dry dioxane (100 mL) with benzoyl peroxide (350 mg) for 4 hours at 85° C. The product was precipitated in ice-water, isolated, and dried under reduced pressure (at 25° C., 40° C., and then 50° C.). The dried product was then characterized for identity (IR and NMR), molecular weight (GPC), and carboxyl content (acidimetry). To convert residual anhydride groups, if any, the resulting product was further hydrolyzed, selectively, (by heating a concentrated dioxane solution at 50° C. for 2–6 hours followed by precipitation and drying) to yield the desired carboxylic acid-bearing C-succinylated liquid polymer. This was made for use in preparing conjugates with basic drugs. Following a similar protocol, five polymers were prepared and characterized for composition (NMR, IR), carboxyl content (acidimetry), and molecular weight (GPC). The respective data are outlined in Table II. All copolymers were liquids with varying viscosities at room temperature. The data in Table II show that the (1) molecular weight can be controlled by the type and amount of PEG used; and (2) molecular weight distributions of the PEG-400-based copolymers are higher than those of PEG-600 counterparts.

TABLE II

Composition and Properties of C-succinylated Polyether-esters

| | | Composition, Mole % | | | | | |
| --- | --- | --- | --- | --- | --- | --- | --- |
| | | Precursor | Theoretical Number of | Equivalent | GPC | | |
| Polymer Number[a] | PEG-type | Molar Ratio[b] PEG/(TMC/CL) | Carboxyl Groups[c] | Weight, g/Eq. | $M_n$, kDa | $M_{w1}$, kDa | PDI |
| 1 | 400 | 23/(62/15) | 3 | 1121 | 4.2 | 10.7 | 2.58 |
| 2 | 400 | 23/(61/15) | 3 | 1246 | 3.8 | 14.9 | 3.89 |
| 3 | 600 | 17/(66/17) | 3 | 1344 | 2.7 | 4.0 | 1.47 |
| 4 | 600 | 17/(66/17) | 5 | 604 | 2.5 | 3.5 | 1.40 |
| 5 | 600 | 171(65/17) | 4 | 1324 | 3.4 | 5.0 | 1.46 |

[a]All polymers were purified by distilling residual monomer under reduced pressure.
[b]PEG = Polyethylene glycol (400 or 600); TMC = trimethylene carbonate; CL = caprolactone.
[c]Expected number of succinic acid-derived carboxyl groups per chain.

Preferred embodiments of the invention have been described using specific terms and devices. The words and terms used are for illustrative purposes only. The words and terms are words and terms of description, rather than of limitation. It is to be understood that changes and variations may be made by those of ordinary skill art without departing from the spirit or scope of the invention, which is set forth in the following claims. In addition it should be understood that aspects of the various embodiments may be interchanged in whole or in part. Therefore, the spirit and scope of the appended claims should not be limited to descriptions and examples herein.

What is claimed is:

1. An absorbable polymer for biomedical and pharmaceutical applications comprising a segmented copolyester having at least one side group comprising a succinic anhydride moiety per chain.

2. An absorbable polymer as in claim 1 made by the process comprising the steps of:
   providing an absorbable, segmented copolyester; and
   reacting the copolyester with maleic anhydride in the presence of a free-radical initiator.

3. An absorbable polymer as in claim 2 wherein the step of reacting the copolyester with maleic anhydride is achieved in an organic solvent.

4. An absorbable polymer as in claim 2 wherein the step of providing an absorbable, segmented copolyester comprises copolymerizing two or more cyclic monomers selected from the group consisting of trimethylene carbonate, ε-caprolactone, gycolide, lactide, p-dioxanone, and 1,5-dioxepan-2-one.

5. An absorbable polymer as in claim 2 wherein the step of providing an absorbable, segmented copolyester comprises end-grafting a polyalkylene succinate with one or more cyclic monomers selected from the group consisting of trimethylene carbonate, ε-caprolactone, glycolide, lactide, pdioxanone, and 1,5-dioxepan-2-one.

6. An absorbable polymer as in claim 5 wherein the polyalkylene succinate comprises polytrimethylene succinate.

7. An absorbable polymer as in claim 5 wherein the polyalkylene succinate comprises polyethylene succinate.

8. An absorbable polymer as in claim 2 wherein the step of providing an absorbable, segmented copolyester comprises end-grafting a polyalkylene glycol with one or more cyclic monomers selected from the group consisting of trimethylene carbonate, ε-caprolactone, glycolide, lactide, p-dioxanone, and 1,5-dioxepan-2-one.

9. An absorbable polymer as in claim 8 wherein the polyalcylene glycol comprises polyethylene glycol.

10. An absorbable polymer as in claim 8 wherein the polyalkylene glycol comprises a block copolymer comprising polyoxyethylene and polyoxypropylene components.

11. An absorbable polymer as in claim 2 further comprising the step of hydrolyzing the anhydride moiety, thereby forming at least one dicarboxylic acid side group per chain.

12. An absorbable polymer as in claim 1 wherein the polymer is a liquid at room temperature.

* * * * *